(12) United States Patent
Ohta et al.

(10) Patent No.: US 6,832,288 B2
(45) Date of Patent: Dec. 14, 2004

(54) READ/WRITE PROCESSING DEVICE AND METHOD FOR A DISK MEDIUM

(75) Inventors: Yoshiyuki Ohta, Kawasaki (JP); Katsuhiko Nishikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 09/770,608

(22) Filed: Jan. 29, 2001

(65) Prior Publication Data

US 2001/0011323 A1 Aug. 2, 2001

(30) Foreign Application Priority Data

Jan. 28, 2000 (JP) ........................................ 2000-019450

(51) Int. Cl.⁷ .............................................. G06F 12/00
(52) U.S. Cl. ........................ 711/112; 711/154; 711/213
(58) Field of Search ................................ 711/112, 154, 711/213

(56) References Cited

U.S. PATENT DOCUMENTS

| | | | | |
|---|---|---|---|---|
| 5,548,795 A | * | 8/1996 | Au ................................ 710/52 |
| 5,586,291 A | * | 12/1996 | Lasker et al. ................ 711/113 |
| 5,696,938 A | * | 12/1997 | Cassetti et al. .............. 711/143 |
| 5,729,718 A | * | 3/1998 | Au ............................... 711/167 |
| 5,870,625 A | * | 2/1999 | Chan et al. ..................... 710/5 |
| 6,219,764 B1 | * | 4/2001 | Jeddeloh ...................... 711/154 |
| 6,415,243 B1 | * | 7/2002 | Mann .......................... 702/181 |

* cited by examiner

*Primary Examiner*—Mano Padmanabhan
*Assistant Examiner*—Mehdi Namazi
(74) *Attorney, Agent, or Firm*—Staas & Halsey LLP

(57) ABSTRACT

A disk device having a read/write processing device to improve the efficiency of operations between write commands that have overlapping data, and to prevent delays in execution processing of starting commands. A read command advance processor unit that processes in advance the read commands for which there are unprocessed write commands in the command queue and a write command overlap data processor overwrites the existing write command write data overlap part when the new write command write data overlaps the write data from an existing write command.

5 Claims, 16 Drawing Sheets

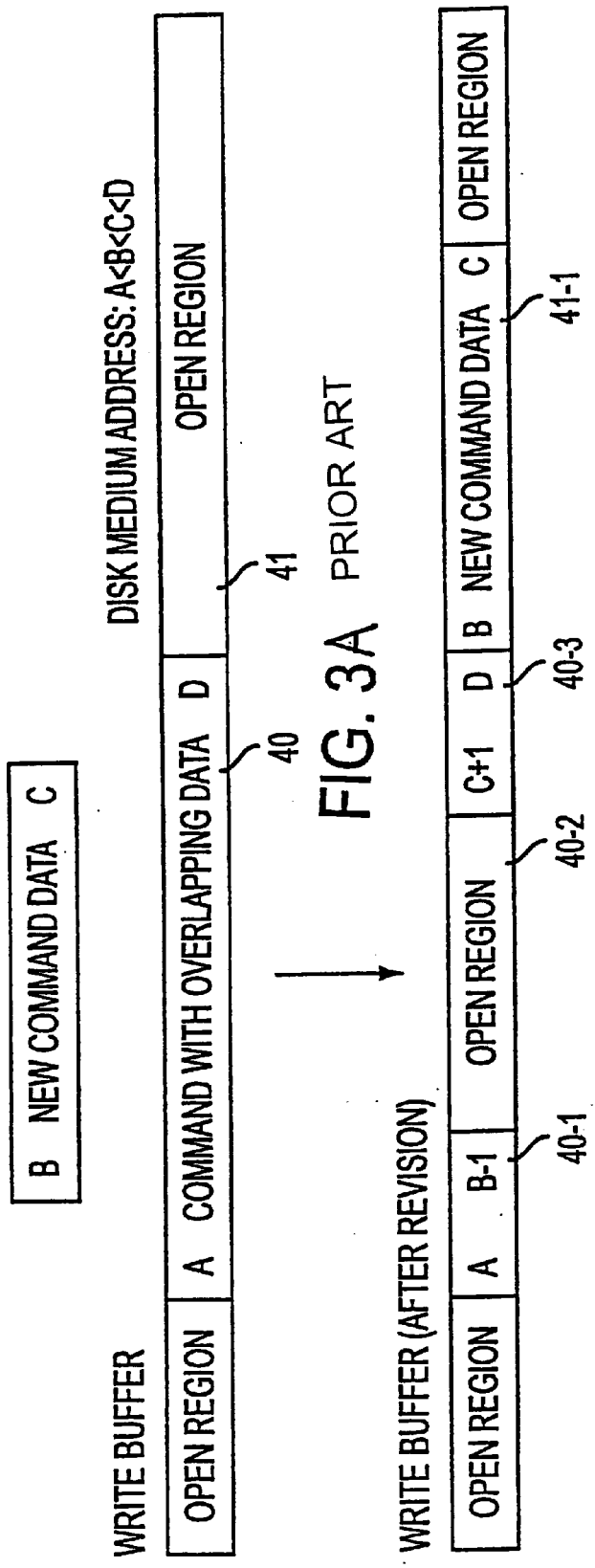

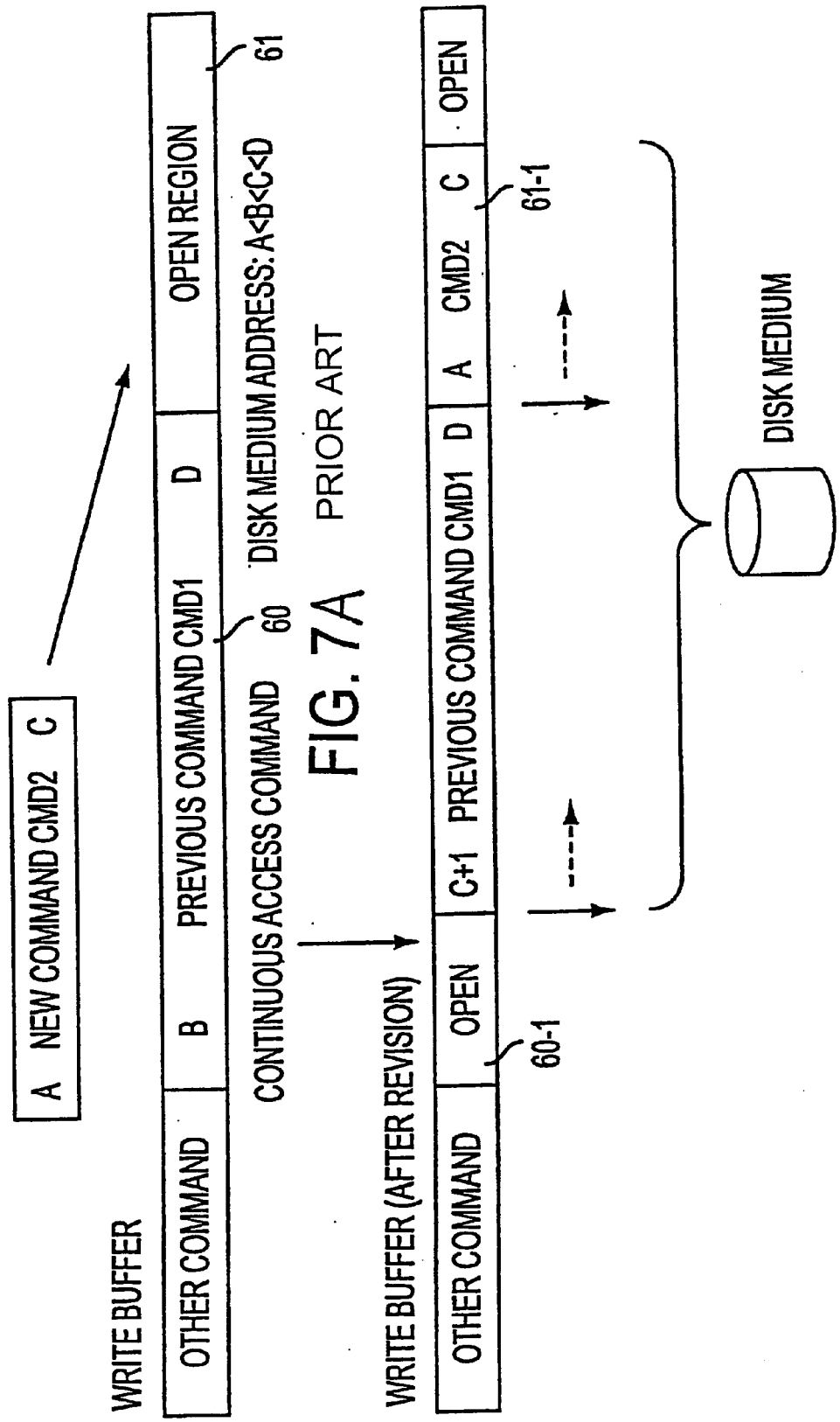

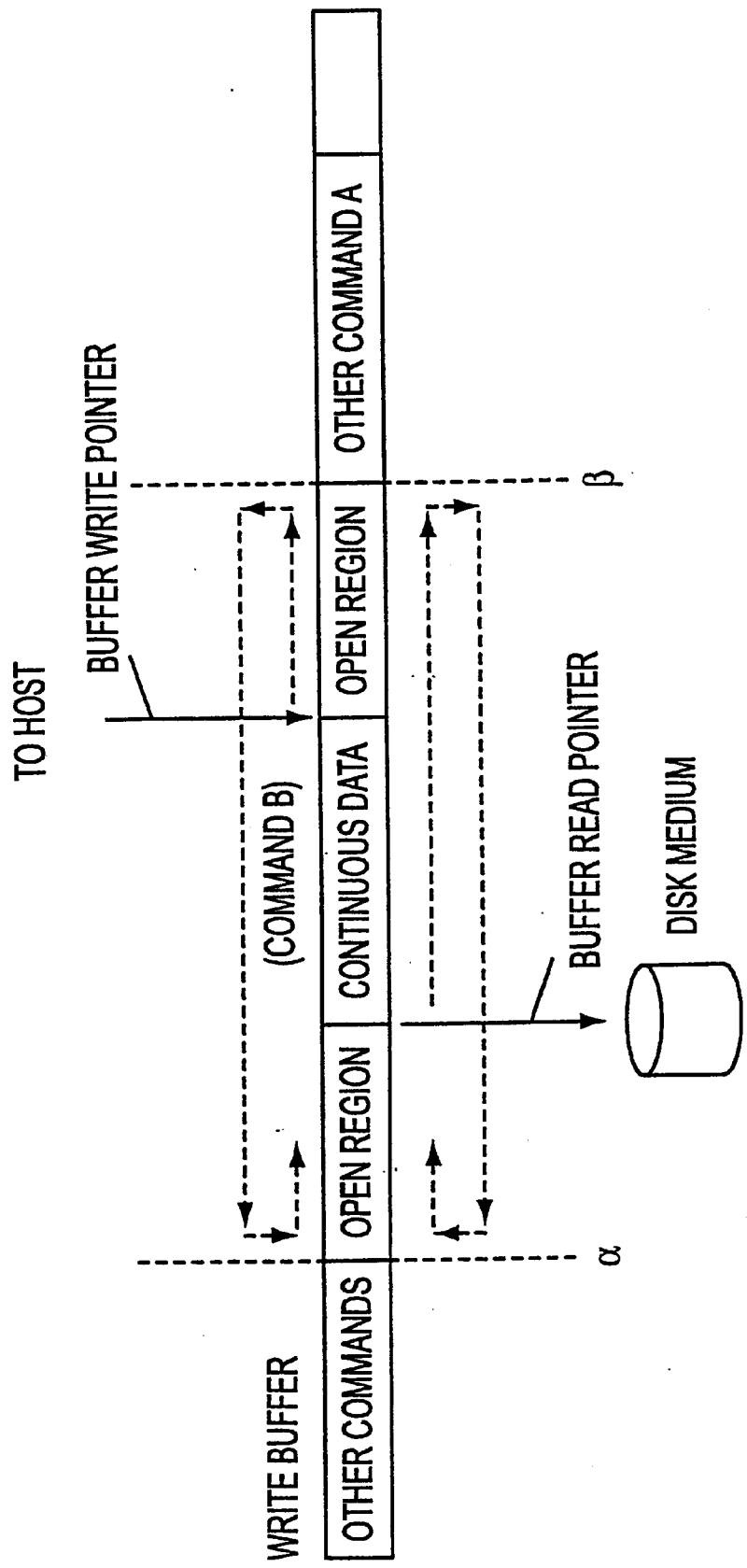

READ/WRITE PROCESSING DEVICE AND METHOD FOR A DISK MEDIUM

CROSS REFERENCE TO RELATED APPLICATIONS

This application is based upon and claims priority of Japanese Patent Application No. 2000-019450, filed Jan. 28, 2000, the contents being incorporated herein by reference.

BACKGROUND OF THE INVENTION

1. Field of the Invention

The present invention relates to a read/write processing device and a read/write processing method for a disk recording medium. More particularly, the present invention relates to a read/write processing device for a disk medium that speeds up read/write processing by reordering commands and eliminating overlapping portions of write data.

2. Description of the Related Art

FIG. 2 is a block diagram of a conventional disk device 30. As shown in FIG. 2, the conventional disk device 30 includes an internal write buffer 31 wherein read/write data is temporarily stored. More particularly, write commands are speeded up by storing data from a host computer in the write buffer 31 in response to a write command, and by returning a data write complete response to the host without waiting for a disk medium 32 to complete the data write. Commands pertaining to the write data accumulated in the write buffer 31 are held in a write command queue 33, and write commands to write data to the disk medium 32 are executed by a command processor beginning with the oldest commands stored in the write command queue 33. A continuous access decision unit 35 holds the last address 36 of the write data from an immediately preceding command and determines whether or not the write data of a write command currently executed accesses an address that is continuous with the last address 36 of the write data from the immediately preceding write command.

In recent years, improvements in performance of control processors in disk devices have made it possible to reorder the write commands in the write command queue 33. More particularly, when there are multiple write commands in the write command queue 33, the write commands can be reordered by calculating, for each command in the write command queue 33, the head seek time plus the rotation wait time required to move to the start data from the final stored data position of the command currently under execution. The command corresponding to the transition that can be performed in the least amount of time is selected as the next write command. The reordering is performed by a reordering process 37.

Conventional write command reordering processes are not efficient processes for a variety of reasons, as discussed below.

If there are write commands in the write command queue that have not yet been written to the recording medium and a new read command is entered, then the new read command must wait until all write commands in the write command queue have been processed before it is executed.

If write commands that are input continuously (in terms of time) are write commands that write data to continuous addresses, then the processing of the continuous write commands cannot continue if all of the other write commands in the queue have not been completed.

If a new write command is entered corresponding to write data that overlaps with that of a write command already in the write command queue, then no consideration is given to the continuity between the overlapping command in the queue and the new command that has been entered.

SUMMARY OF THE INVENTION

The present invention solves the above and other problems of the prior art by providing a read/write processing device and method for a recording medium that efficiently reorders write commands and eliminates overlapping data.

Embodiments of the present invention are achieved with a disk device, comprising a write buffer to store data for a write command received from a host. A command queue stores commands (read and write) for which an operation for accessing a disk medium has not been completed. A reordering processor returns a data write acknowledgment and selects from the write commands stored in the command queue a next write command to be executed, the next write command to be executed being a command having a starting data storage address on the disk medium that can be reached in the least amount of time from an address on the disk medium at which the last data of a command currently being executed is stored. A command processor executes the command selected by the reordering processor.

The disk device in accordance with embodiments of the present invention may further comprise a write command overlapping data processor checking for redundancies with the data of the write commands in the command queue in response to a read command being entered while a write command is being executed; and a read command starting processor returning the write command currently being executed to the command queue and executing the read command in response to the write command overlapping data processor confirming that there is no data redundancy.

In accordance with embodiments of the present invention, a newly input read command is set to the end of the command queue when the newly input read command includes read data overlapping with the write data among the write commands in the command queue or the write command being executed, and the reordering processor selects the write command having overlapping data and the command processor executes the read command last stored in the command queue when the write command having overlapping data is executed.

The disk device in accordance with embodiments of the present invention may further comprise a write command overlapping data processor checking for redundancies with the data of a write command in the command queue in response to a write command being entered while a write command is being executed, wherein the write command overlapping data processor overwrites an overlapping data part of an existing write command in the write buffer if a part of the accessed data for the new command includes redundancies with at least a part of accessed data for the existing write command in the command queue, and replaces a corresponding part of the existing write command in the write buffer with new data, and deletes the new command when accessed data of a new write command is completely included in the existing command.

The disk device in accordance with embodiments of the present invention may further comprise a continuous access decision unit storing in memory a starting address and an ending address of the accessed data from a previous command for write commands input continuously over time, and determining that an access is continuous if the starting address of the accessed data for a new write command is between the starting address and the ending address of the accessed data of the previous command; a write buffer storage device overwriting the data from the previous command in the write buffer and storing the write data from a host in a specified position in the write buffer; and a continuous access command storage unit storing a continuous series of write commands, wherein a continuous access operation is performed by moving a write data storage location for a new command to the starting position of the redundant data when, in the write commands that are input continuously over time, an earlier half of the actual command accessed data overlaps with a later half of the accessed data for the previous command.

The disk device in accordance with embodiments of the present invention may further comprise a write command overlapping data processor determining whether accessed data is redundant with data corresponding to a write command existing in the command queue in response to entry of a next write command, and if it is determined that a portion of the accessed data for the next write command is redundant with at least a portion of the accessed data of the write command in the command queue, deleting the redundant data from the existing write command in the write buffer; and a write buffer read device continually storing to the disk medium data that has been stored in different places in the write buffer, wherein the write command overlapping data processor stores a first write command except for the redundant accessed data and a newly-input second write command continuously when the second write command has accessed data that is partially redundant with the earlier half of the accessed data of the first write command present in the command queue, and by continually performing a medium write relative to the later-half access data of first write commands having continuous addresses in the disk medium and stored in different areas of the write buffer after the medium write is performed for the second write command overlapping accessed data.

The disk device in accordance with embodiments of the present invention may further comprise a continuous access decision unit determining if the next write command is a command accessing a disk medium address continuous with an address of a write command having data currently being stored to store it to the write buffer when data is transferred from a host to the write buffer; and a largest free space detector moving a storage position in the write buffer for a next write command to a starting position of the largest free space in the write buffer in response to the continuous access decision unit determining that the continuous address cannot be accessed when the final data from the current write command is stored in the write buffer, wherein the data is stored in a continuous region of the write buffer while leaving a write buffer transfer position alone if the next write command is a command that accesses the disk medium address continuous with the current write command, and if the command does not access a continuous address on the disk medium, then the write buffer transfer position is changed to a starting position of a largest free space in free regions scattered in the write buffer and the write data is stored in the largest free space.

The disk device in accordance with embodiments of the present invention may further comprise a write buffer storage unit storing the remaining the data to other free spaces in the write buffer when an open region in the write buffer is filled completely during a storage operation to store the current write command into one open region in the write buffer when data corresponding to a write command is transferred from a host; a continuous access pointer recording device recording an indication that the remaining data has been stored in the other open regions because the data in the current write command cannot be stored in a single continuous open region in the write buffer; and a write buffer read unit storing continuous data from a different position on the write buffer on the disk medium when there is a medium write storing the data in the write buffer to the disk medium.

The disk device in accordance with embodiments of the present invention may further comprise a command processor executing a command selected by the reordering processor; a continuous access pointer unit storing in a memory a position in the write buffer that has been skipped when a buffer write is performed after data is skipped because data from another write command exists in the write buffer when a write command in a buffer write process begins the medium write; and a write buffer read device reading data from different locations and storing the data to the disk continuously when data that should be stored in a continuous region on the disk medium is stored in different places of the write buffer, wherein a reordering process is performed for the commands that perform the buffer write.

The disk device in accordance with embodiments of the present invention may further comprise a write buffer storage unit searching the contents of the write buffer in a forward and backward direction from a current buffer storage position in the write buffer when a medium write operation corresponding to a write command being entered into the write buffer begins, extracting a point where data corresponding to other commands exists at positions previous to the current storage position, and extracting a point where data corresponding to other commands is found at a position after the current storage position, and performing a buffer storage operation for new data by wrapping around the two points; and a buffer read unit reading the data from the write buffer between the two points, even when writing to the disk medium, wherein data is stored from other write segments within the write buffer where buffer writing is currently performed when the write command being input into the write buffer begins to perform the medium write.

In accordance with embodiments of the present invention, the speed of read/write processing for a disk device is increased by effectively eliminating overlapping portions when write commands are input having write data that overlaps the data in a write buffer, and by increasing the speed of processing of newly input read commands, even if there are already write commands in the write command queue that have not been processed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 3A and 3B illustrate a conventional operation for processing overlapping write data.

FIGS. 7A and 7B illustrate a conventional continuous write processing operation when write data overlaps the first part of the write data of another command.

FIG. 16 illustrates an operation wherein a write buffer includes virtual segments in accordance with embodiments of the present invention.

DESCRIPTION OF THE PREFERRED EMBODIMENTS

Figure 1:
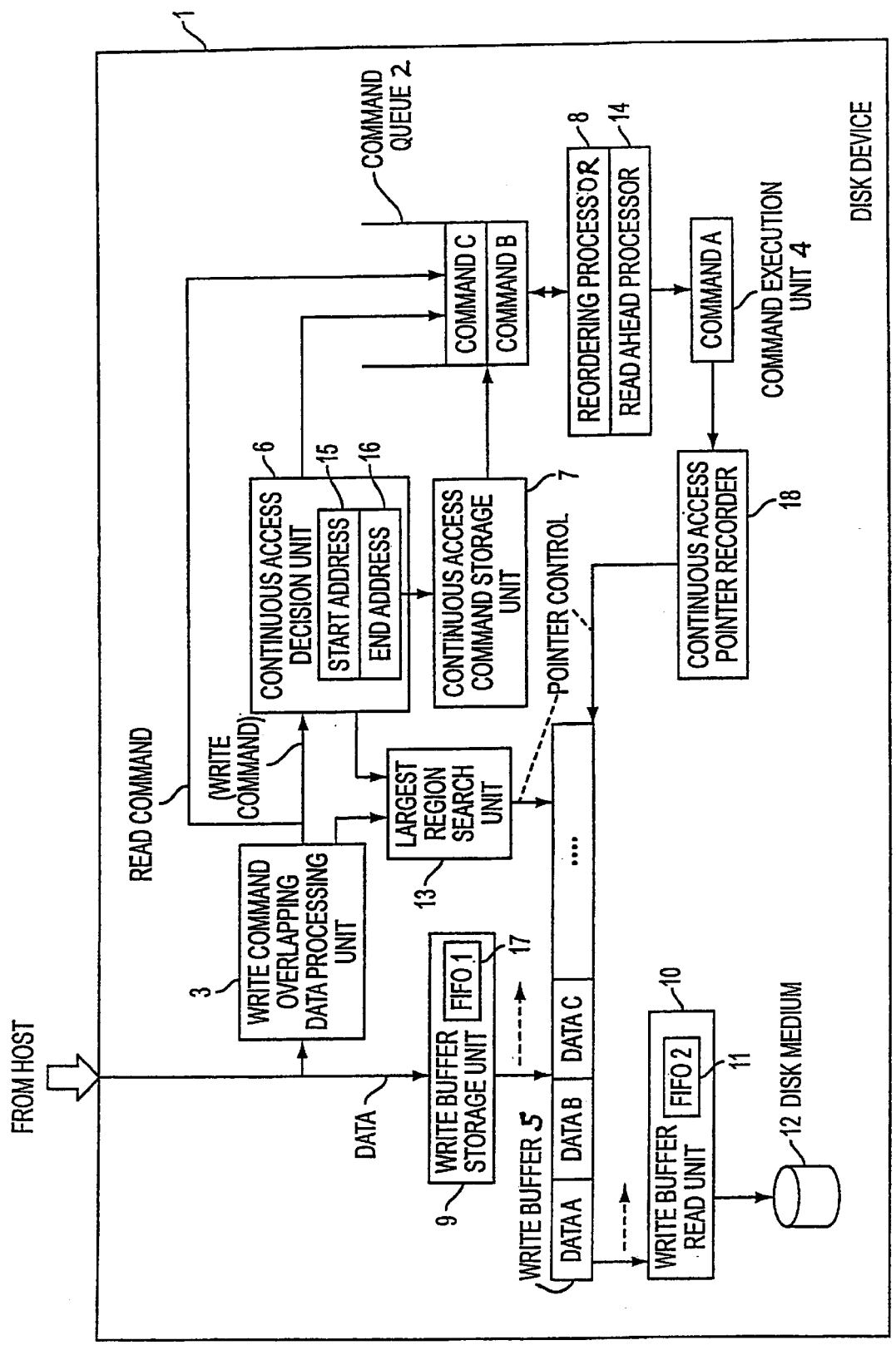
FIG. 1 is a block diagram of a disk device in accordance with embodiments of the present invention.
Figure 2:
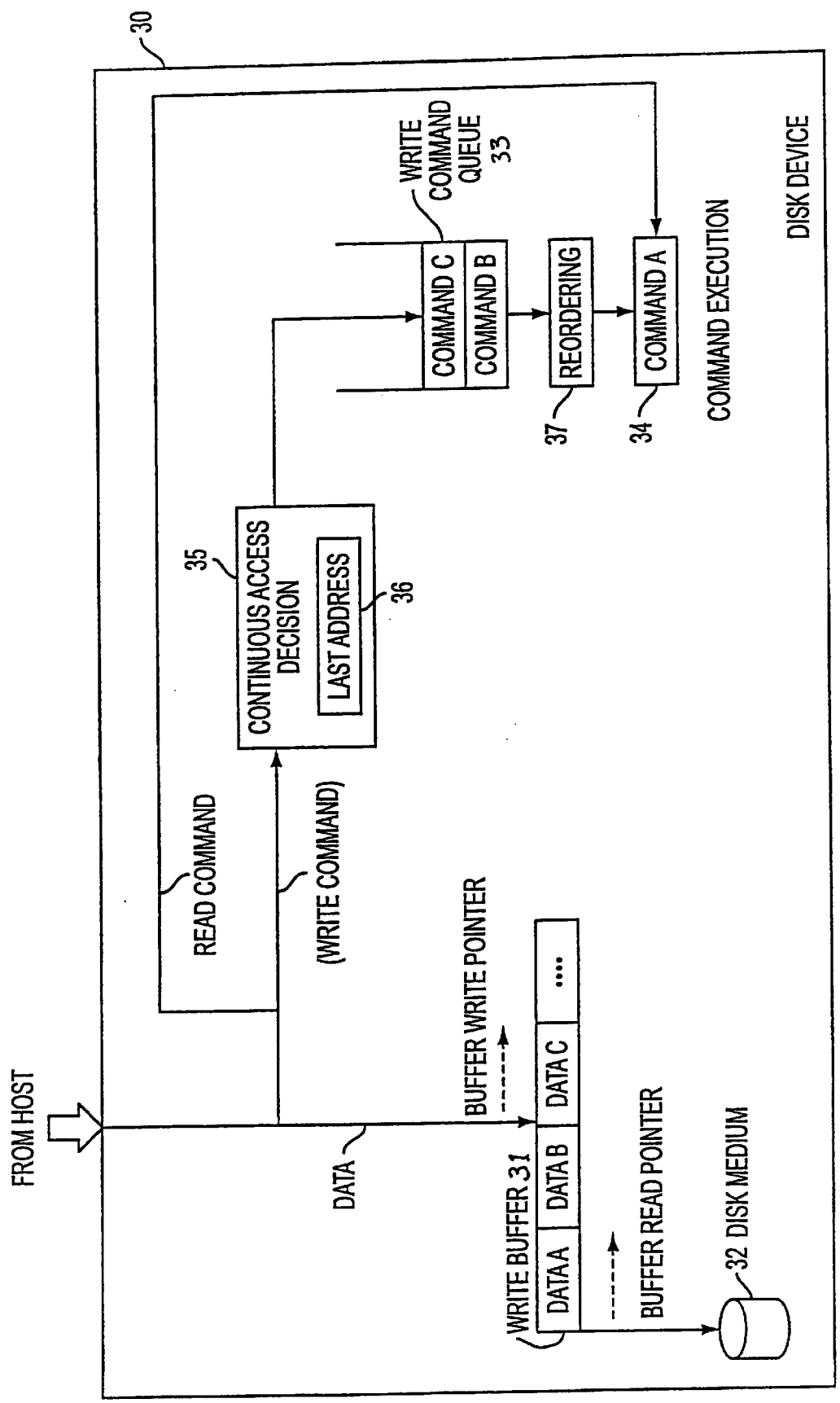
FIG. 2 is a block diagram of a conventional disk device.

Reference will now be made in detail to the preferred embodiments of the present invention, examples of which are illustrated in the accompanying drawings, wherein like reference numerals refer to like elements throughout.

FIG. 1 is a block diagram of a disk device 1 in accordance with embodiments of the present invention. In operation of the disk device 1 shown in FIG. 1, after a hit check is performed on a read/write cache (not shown), a read command input from a host computer is placed in a command queue 2, and a write command overlapping data processing unit 3 performs a check to determine whether or not there is data overlap with a write command stored in the command queue 2. If there is a write command stored in the command queue 2 having overlapping data, then the input read command waits in the command queue 2 until a recording medium write corresponding to the write command is completed, after which the read command is placed in a command execution unit 4, and a data read is performed. If there is no overlapping data, then a read ahead processor 14 skips over the write commands in the command queue 2 and inputs the read command into the command execution unit 4.

A write command (referred to hereinbelow as the "write command A") input from the host computer is checked by the write command overlapping data processing unit 3 for data overlap with the write commands stored in the command queue 2. When there is data overlap, the overlapping portion of the data in a write buffer 5 or in the write command A is discarded. Furthermore, a continuous access decision unit 6 performs a check to determine if the access will be for data addresses continuing from those of the previous write command. The continuous access decision unit 6 compares the value relationships of not only the end address from the previous command, but the start address as well. If the previous command is a command for the end of a link continuous access command, then this will be the start address of the start command for the continuous access. If it is determined that the write command A is a command that accesses continuous addresses that include redundancies with a previous command, then the write command A is stored in a continuous access command storage unit 7, and a reordering process is performed along with the command in the continuous access command storage unit 7 and the commands in the command queue 2 by the reordering processor 8. When the write command A is not a continuous access command, the write command A is stored in the command queue 2 and performed after reordering is performed.

The write data corresponding to the write command A is stored in the write buffer 5 by a write buffer storage unit 9. If the continuous access decision unit 6 has determined that the data is continuously accessed (including the overlap), then the write data is stored in a region within the write buffer 5 adjacent to the region for the previous command. If a portion of the data is detected as being overlapping, then overwriting will begin on the overlapping data of the previous command.

Writing to a recording medium from the write buffer 5 is performed through the FIFO2 (11) of a write buffer read unit 10. In the case that the data from a given command is split for storage into different empty regions, the data held in the FIFO2 (11) is used in writing to the recording medium while a buffer read pointer is moved, making it possible to continuously write the data to the disk medium 12. If continuous access is not possible, then a maximum open region search unit 13 extracts an area having the largest free space from the write buffer 5 and stores the data in the extracted area. Furthermore, if the amount of write data exceeds the size of the extracted free space, then the buffer write position moves to the start of a new empty area and the balance of the write data is stored in the new empty area.

When a recording medium write is performed by the write buffer 5 and the command data and the continuous access data from a single command are stored in different areas of the write buffer 5, the write buffer read unit 10 stores continuously to the disk medium 12 the data that has been stored discontinuously.

The present invention will now be described below with reference to FIG. 1, and FIGS. 3 to 14.

A write command reordering operation corresponding to a read ahead operation in accordance with the present invention will be described first below.

In the conventional example of write command reordering described hereinabove, reordering was performed only for the write commands in the write command queue. More particularly, in accordance with the conventional example, when a read command is input while a write command is being executed, the read command has to wait until all of the write commands in the queue are completed before the read command is executed.

In a reordering operation in accordance with embodiments of the present invention, a check is performed to determine whether there is a write command in the command queue 2 that accesses the same address as a read command when a new read command is input while a write command being executed. If there is no write command that accesses the same address as the newly input read command, then the newly input read command is executed at the point in time that the write command currently being processed is completed, after which the write commands that remain in the command queue 2 are executed. In the above-described manner, the speed of the recording medium write process for the write commands stored in the command queue 2 can be increased, and the response to read commands can be expedited by performing the processing of the read command that has been input first.

Embodiments of the present invention are not limited to the above-described method of interrupt for read commands while write commands are being executed, wherein the read command waits until the write processes for all data in the write command have been completed, and other types of interrupt methods are possible. For example, the interrupt can be performed by immediately interrupting the recording medium write operation, returning the write command to the command queue 2 as a command to write the remaining data, and processing the read command first. In this case, it is necessary to determine whether or not there is overlap between the data of the write command that is returned to the command queue 2, the data of the read command that was performed first, and the other write commands in the command queue 2. However, this does expedite the execution of the read command. Furthermore, when the read command has been completed, the multiple write commands in the command queue 2, including the write command that was returned to the command queue 2, are reordered and the write command that can be performed first given the shortest seek and rotation wait time is selected.

A read ahead process including overlapping data in accordance with embodiments of the present invention will now be described below.

In accordance with the conventional example, the read command has to wait until all of the write commands in the command queue have been completed, and therefore there is no need to worry about overlapping data. However, in accordance with embodiments of the present invention, when a read command has an overlapping part with a write command being executed or with a write command in the command queue 2, the overlapping write command is stored, and a new read command is set at the end of the command queue 2.

Figures 4A, 4B:
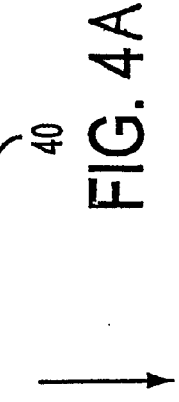
FIGS. 4A and 4B illustrate an operation for eliminating overlapping write data with a disk device in accordance with embodiments of the present invention.

The operation by which overlapping write data is eliminated in accordance with embodiments of the present invention will now be described below. FIGS. 3A and 3B illustrate an example of conventional processing when there is overlapping write data. FIGS. 4A and 4B illustrate an example of processing overlapping write data with a disk device in accordance with embodiments of the present invention.

In the description below, the region of the write buffer notated as "command" or "CMD" does not store the actual command itself, but rather is a region for storing the write data to be stored on the disk medium by the command.

As shown in FIG. 3A, in the conventional example, write command data having a disk medium start address A and a disk medium end address D is stored in the write buffer region 40.

In the status shown in FIG. 3A, a new write command is to be executed with write data having a starting address B and an ending address C on the disk medium (where A<B<C<D). As shown in FIG. 3B, it is assumed that, in the data region 40, the data region 40-2 from the disk medium address B to the disk medium address C is vacant. Therefore, the only remaining regions in the region 40 are data region 40-1, which is the portion from the disk medium address A to the disk medium address B−1, and data region 40-3, which is the portion from the disk medium address C+1 to the disk medium address D.

In accordance with the conventional example shown in FIGS. 3A and 3B, write data for the disk medium starting address B and disk medium ending address C corresponding to the new write command is stored in region 41-1, which is the starting part of region 41, the largest vacant region.

As described above, in the conventional example shown in FIGS. 3A and 3B, only the old commands in the command queue have the overlapping parts eliminated. Conversely, if the new write command data is completely included in the write command data corresponding to a write command in the command queue, when the write data in the overlapping write command that exists in the command queue is corrected, then the continuous data is split and excessive seek/rotation wait time results.

In accordance with embodiments of the present invention shown in FIGS. 4A and 4B, if a new write command is input having write data corresponding to the disk medium start address B and disk medium end address C (where A<B<C<D), then, as shown in FIG. 4B, the data region 40 is overwritten with the new write command data. More particularly, the new write command data is overwritten in the data region 40-2 within data region 40, ranging from the disk medium address B to the disk medium address C.

In the manner shown in FIGS. 4A and 4B, in accordance with the present invention, the appropriate region of the write buffer 5 is overwritten by the write command overlapping data processing unit 3 when the newly input data is included completely within the data of an existing command. By overwriting in the above manner, the data having continuous addresses will not be split in the write buffer 5.

Figures 5A, 5B:
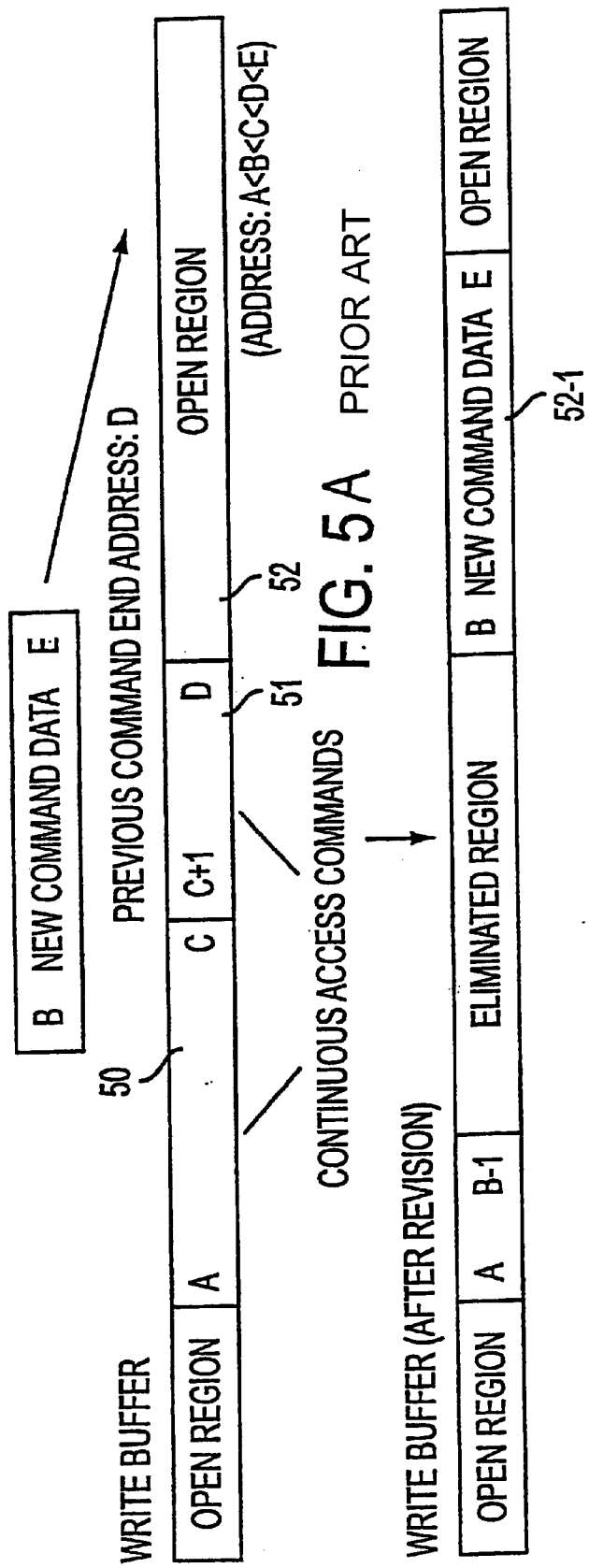
FIGS. 5A and 5B illustrate a conventional continuous write processing operation for overlapping data.
Figures 6A, 6B:
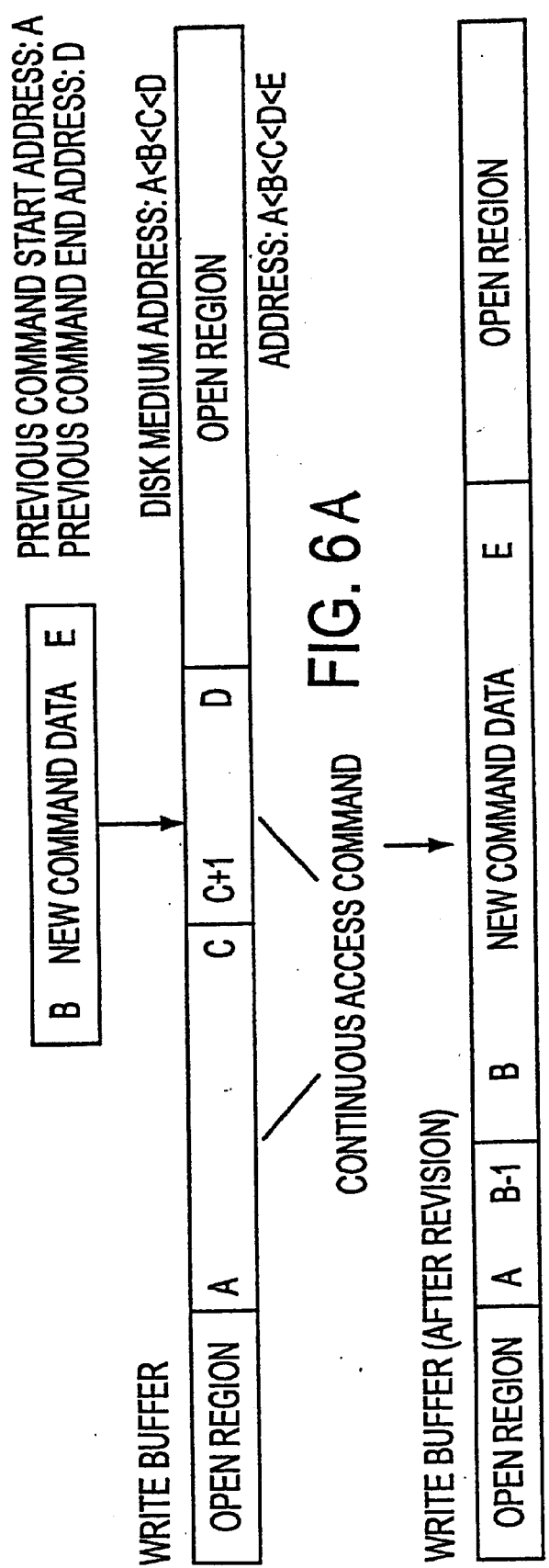
FIGS. 6A and 6B illustrate a continuous write processing operation for overlapping data with a disk device in accordance with embodiments of the present invention.

A continuous write processing operation when there is overlapping data will now be described below. FIGS. 5A and 5B illustrate an example of a conventional write processing operation when there is overlapping data. FIGS. 6A and 6B illustrate a continuous write processing operation when there is overlapping data with a disk device in accordance with embodiments of the present invention.

As shown in FIG. 5A, in accordance with the conventional example, write command data having a disk medium start address A and a disk medium end address C is stored in region 50. Write command data having a disk medium start address C+1 and a disk medium end address D is stored in region 51.

In the conventional example shown in FIG. 5A, if a new write command is input for write data from the disk medium starting address B to the disk medium ending address E (where A<B<C<D<E), then, as shown in FIG. 5B, the portion of the data region 50 from the disk medium address B to the disk medium address C and the data region 51 are discarded and made an open region.

As shown in FIG. 5B, the write data from the disk medium start address B to the disk medium end address E accompanying a new write command is stored in the starting part 52-1 of region 52, which is the largest open region. The result of this is that there are two commands set in the command queue.

In the conventional example shown in FIGS. 5A and 5B, in the case of write commands that are input sequentially over time, only the disk medium end address for the write data of a previous command is stored. Therefore, if the disk medium start address for the write data of the next sequentially input write command is "1+the stored disk medium end address," then the data in the write buffer would be continuously stored on the disk medium rather than generating a seek as a continuous access command. However, if the first half of the write data of a subsequent command matches the second half of the write data of a prior command, the conventional approach can not treat the situation as a continuous access.

In the continuous write processing operation in accordance with the present invention, as shown in FIG. 6A, which is the same as FIG. 5A, if a new write command is input for the write data from the disk medium start address B to the disk medium end address E (where A<B<C<D<E), then, as is shown in FIG. 6B, the overlapping data in the write buffer is overwritten and the remaining data is stored in an open region that is read later. This operation overwrites the overlapping data of the existing command, integrating the commands into a single command.

In accordance with embodiments of the present invention shown in FIGS. 6A and 6B, the disk medium start address of the previous write command data is stored, rather than storing just the disk medium end address of the write data for the previous command. In particular, the start address is stored in the start address storage unit 15, and the end address is stored in the end address storage unit 16, shown in FIG. 1. By storing the start address and the end address of the previous write command data, if the disk medium start address of the write data for a subsequently input command is in the range between the start address and the end address thus stored, then it is determined that there is a continuous access. The write data of the subsequent command, including the portion that overwrites the overlapping part of the write data from the previous command, is stored in the write buffer 5.

In accordance with the present invention, in performing disk medium write operations, it is possible to eliminate the need for generating new seek plus rotation wait times by using continuous access. However, if a disk medium write for a previous command has already been started, then the check verifies whether or not the subsequent write command disk medium start address is in a range of [medium write execution address+a, end address]. Here the "a" is a margin for the advancement of the medium write until the beginning of writing the data from the subsequent command to the write buffer 5 after detecting the medium write execution address.

A continuous write processing operation when there is overlapping data in the first half of the write data of a previous command in accordance with the present invention will now be described below.

Figure 8:
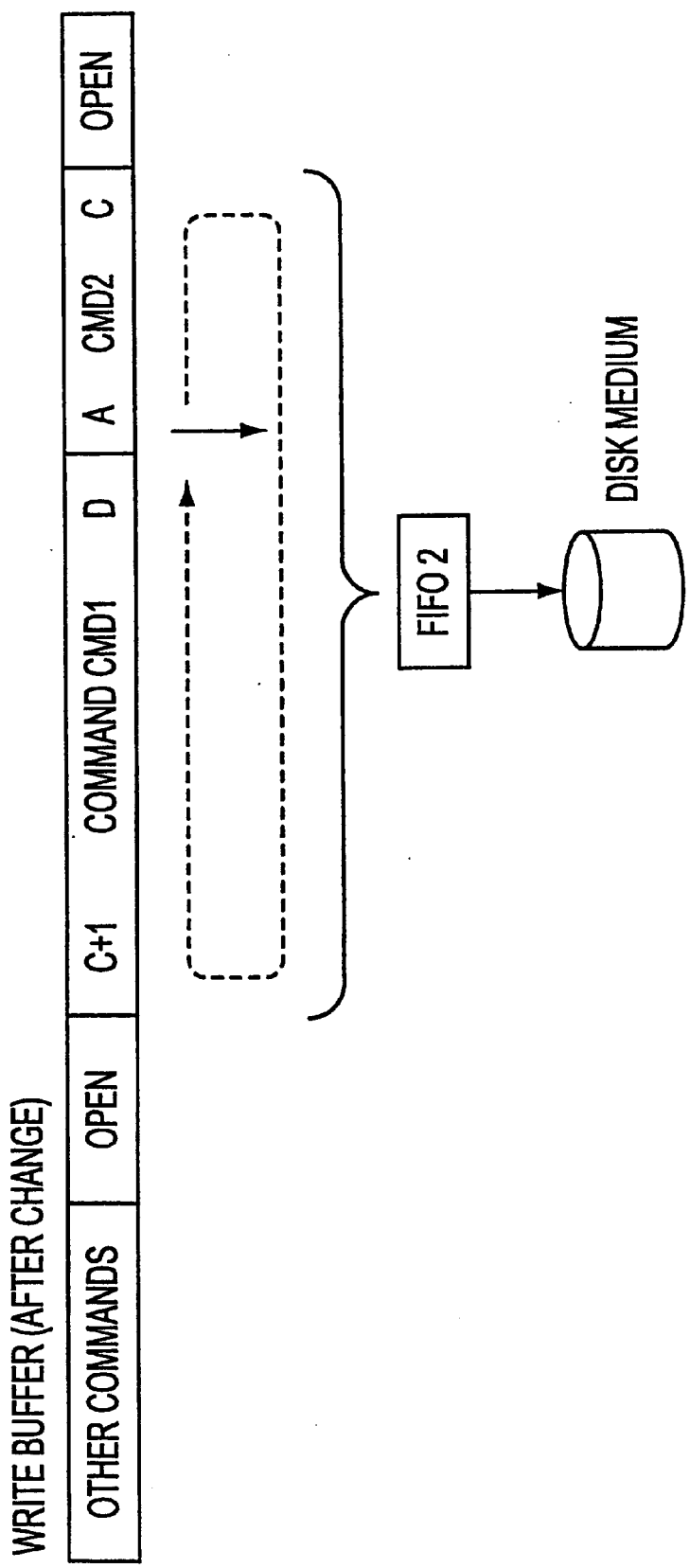
FIG. 8 illustrates a continuous write processing operation when write data overlaps the write data of a previous command with a disk device in accordance with embodiments of the present invention.

FIGS. 7A and 7B illustrate a conventional continuous write processing for a write command having overlapping data with the first half of the write data of the previous command. FIG. 8 illustrates continuous write processing for a write command having overlapping data with the first half of the write data of the previous command with a disk device in accordance with the present invention.

As shown in FIG. 7A, the write command data having a disk medium start address B and a disk medium end address D is stored in region 60. In the situation shown in FIG. 7A, if a new write command is entered for write data from the disk medium start address A to the disk medium end address C (where A<B<C<D), then, as shown in FIG. 7B, of the data in region 60, the data region 60-1 from disk medium address B to the disk medium address C is set to an open region.

As shown in FIG. 7B, the write data from the disk medium start address A to the disk medium end address C accompanying the new write command is stored in region 61-1, the starting part of the empty region 61. The result is that the write data stored to the write buffer has two independent commands.

Conventionally, when an input write command has write data that partially overlaps the first half of the write data of an existing command, both the write data of the existing command without the overlap and the write data of the new command with the overlapping part are in the write buffer, and reordering is performed so that each will be an independent command.

In accordance with the present invention, as shown in FIG. 8, the continuous write operation is the same as the conventional operation up through the storage of the data for the new write command into the write buffer in the same form as the conventional example shown in FIG. 7A. In accordance with embodiments of the present invention, a first-in-first-out memory FIFO 2 (11) is provided between the write buffer 5 and the disk medium 12. After the read pointer of the write buffer 5 is moved from the start to the end of command 2 (CMD2), by returning to the start of command 1 (CMD1), the command 2 and command 1 write data are stored all at once in FIFO2 (11). From the point in time that the FIFO2 (11) capacity is filled up, the data begins to transfer to the disk medium. Therefore, even when the pointer in write buffer 5 moves to another command data part, the control is such that the data write to the disk medium 12 is not suspended.

By performing the continuous write operation in accordance with the present invention as described above with reference to FIG. 8, if a write command 2 is input, the write command 2 having corresponding write data that is overlapping with the first half of the write data of an existing write command 1, then, the storage is performed sequentially with first command 2 and then command 1. More particularly, after the data of the end address of command 2 is transferred to the FIFO2 (11), the data that has been stored in the FIFO2 (11) is written to the disk medium 12 during the interval while the buffer read pointer is moving to the command 1 start data position. Afterwards, data can be stored continuously to the disk medium 12 from the command 1 start data, which is continuous address data, through FIFO2 (11).

An operation for storing write data with continuous address access commands into a continuous region in the write buffer with a disk device in accordance with embodiments of the present invention will now be discussed below.

Figure 9:
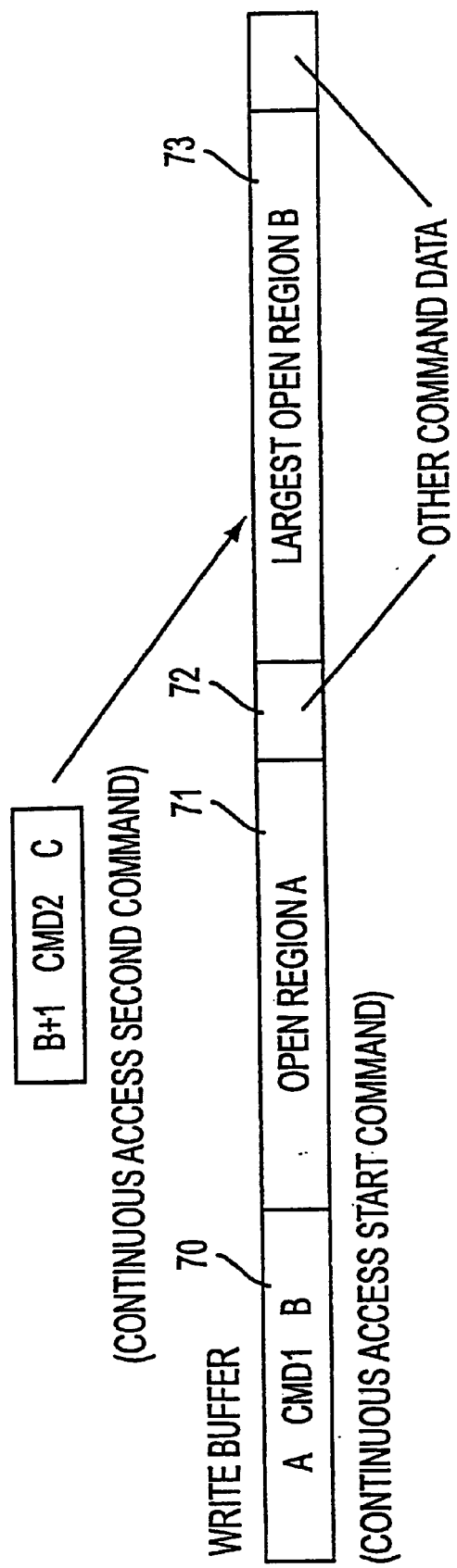
FIG. 9 illustrates a conventional operation for storing the write data of a continuous address access command in a continuous area of a write buffer.
Figure 10:
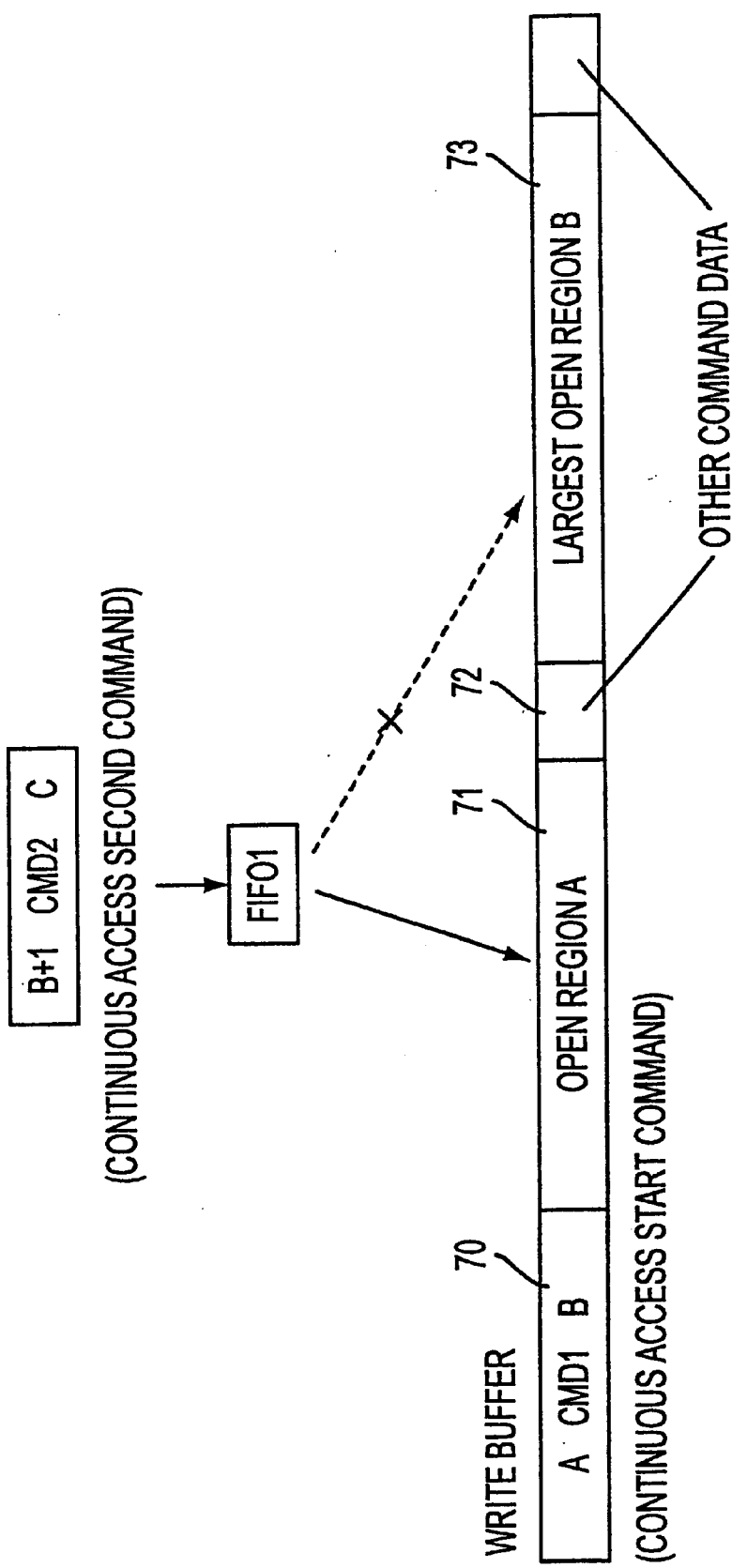
FIG. 10 illustrates an operation to store continuous address access command write data into a continuous region in a write buffer with a disk device in accordance with embodiments of the present invention.

FIG. 9 illustrates a conventional process for storing write data with continuous address access commands. FIG. 10 illustrates an operation for storing write data with continuous address access commands with the disk device in accordance with the embodiments of the present invention.

According to the use of command reordering, writing to the disk medium is sometimes not performed from the oldest to the newest, and thus there will be discontinuous open regions in the write buffer. In the conventional example shown in FIG. 9, the largest free region in the write buffer is normally selected when there is a new write command, and the data is stored in this region.

As shown in FIG. 9, in the conventional continuous access process, the write data of the write command 1 (CMD1) (i.e., the continuous access start command) having a disk medium start address A and a disk medium end address B is stored in the region 70, after which there is an open region A 71, another command data region 72, and a largest open region B 73. At this time, the write command 2 (CMD2) corresponding to the disk medium start address B+1 and the disk medium end address C is input as the second command in the continuous access process, at which time the control is applied so that the data corresponding to the write command (2) is stored in the largest open region 73. The reception of the start data is already begun relative to the multiple write commands that write to continuous addresses before the start address is determined to be the end address of the previous command+1.

As shown in FIG. 10, in accordance with embodiments of the present invention, when there is a transfer of data from the host, the data is stored in the write buffer 5 through a first-in-first-out memory FIFO1 (17). The write buffer storage unit 9 includes the FIFO1 (17). While the data from the host passes through the FIFO1 (17), a check is performed to determine if the addresses are continuous by determining whether the start address of the write command is the end address of the previous command+1. If the check determines that the addresses are continuous, then the buffer write pointer does not move from the write data of the previous command. When this is done, it is possible to store data related to all of the commands for the continuous address accessing in a continuous region in the write buffer 5.

As shown in FIG. 10, in operation of the continuous address access processing in accordance with the present invention, the data for the second command in the continuous access (CMD2) is checked for continuity with the previous command while it is stored in FIFO 17. Because the write command 2 (CMD2) continuity is detected, the write data for the write command 2 (CMD2) is stored in the open region 71.

An operation of processing a write command having write data that is larger than the largest free region with a disk device in accordance with embodiments of the present invention will now be described below.

Figure 11:
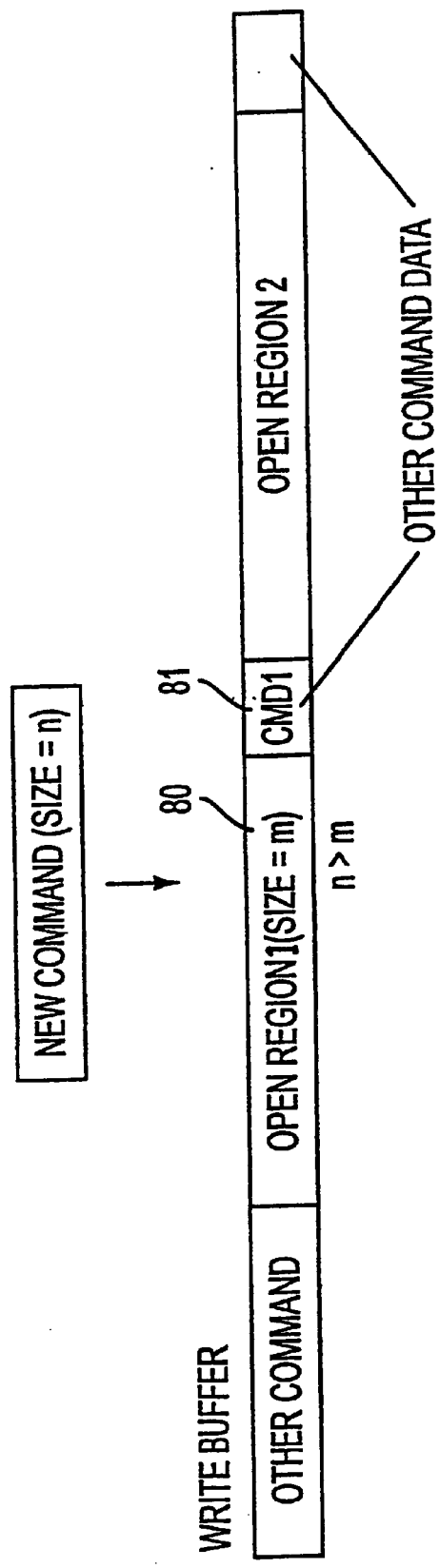
FIG. 11 illustrates a conventional write data processing operation for write data having a size exceeding a largest open region.
Figure 12:
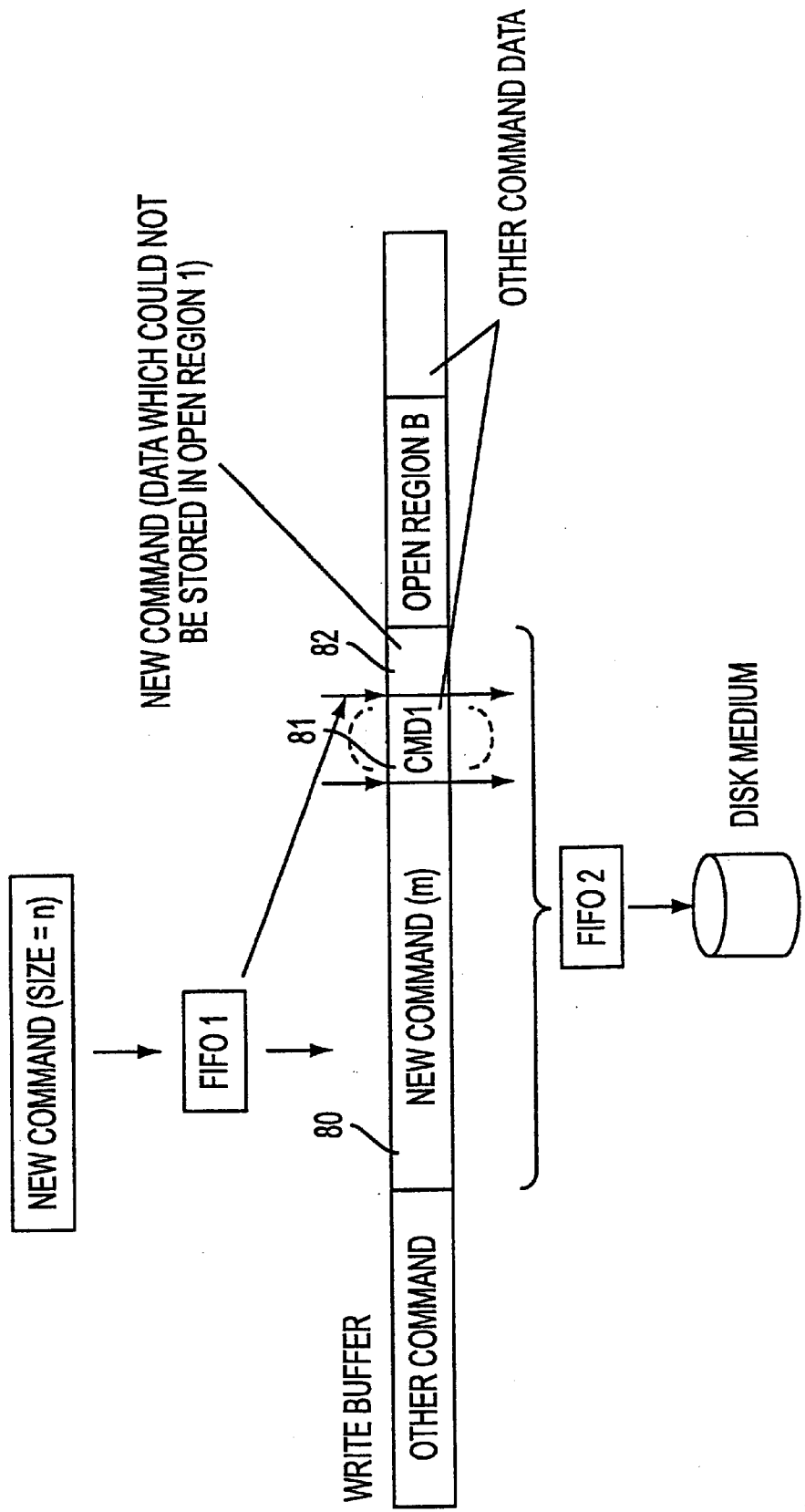
FIG. 12 illustrates a write data processing operation for write data exceeding a largest open region with a disk device in accordance with embodiments of the present invention.

FIG. 11 is a conventional example of processing write commands having write data that exceeds the size of the largest free region. FIG. 12 illustrates an operation of processing a write command having write data exceeding the size of the largest free region with a disk device in accordance with embodiments of the present invention.

In the conventional write buffer control shown in FIG. 11, reordering causes discontinuous open regions in the write buffer. When the amount of write data exceeds the free space, data transfer from the host pertaining to the applicable command is interrupted until the disk medium write for the existing write data stored in the adjacent region is completed. Referring to FIG. 11, when a new command having data of a size n is input, and an open region 1 (80) of size m (where m<n) is the largest free region, it is possible to store the data of size m in the free region 80, leaving n—m of unstored data. Until the data in region 81, which stores the command CMD1 write data and is adjacent to the open region 80, is sent to the disk medium 12, the transfer of the write data corresponding to new commands to the write buffer is suspended.

In accordance with embodiments of the present invention, the FIFO1 (17) is provided at the early stage of the write buffer 5. After data of size m (where m<n) is stored in the write buffer region 80 shown in FIG. 12, the operation for storing the remaining n-m of data to the open region 82, which is adjacent to the command CMD1 region 81, begins without waiting for the transfer to disk medium 12 of the command CMD1 data of the adjacent region 81. In accordance with embodiments of the present invention, while the buffer write pointer moves from region 80 to the open region 82, n-m of write data accumulates in the FIFO1 (17), and at the point in time that the buffer write pointer moves to the starting position of the open region 82, data transfer to the write buffer 5 restarts.

Thus, in accordance with the present invention, by storing the continuity of the two separate buffer read points in a continuous access pointer memory 18, the situation where the data belonging to a single command is stored in different regions is recorded as well.

In the disk medium write operation in accordance with the present invention, storing the data to the disk medium 12 through the FIFO2 (11) makes it possible to transfer the data continuously to the disk medium 12, even when the buffer read pointer moves to a different area in the write buffer 5.

An operation wherein commands for which data is being input are added to the reordering with a disk device in accordance with embodiments of the present invention will be described below.

Figure 13:
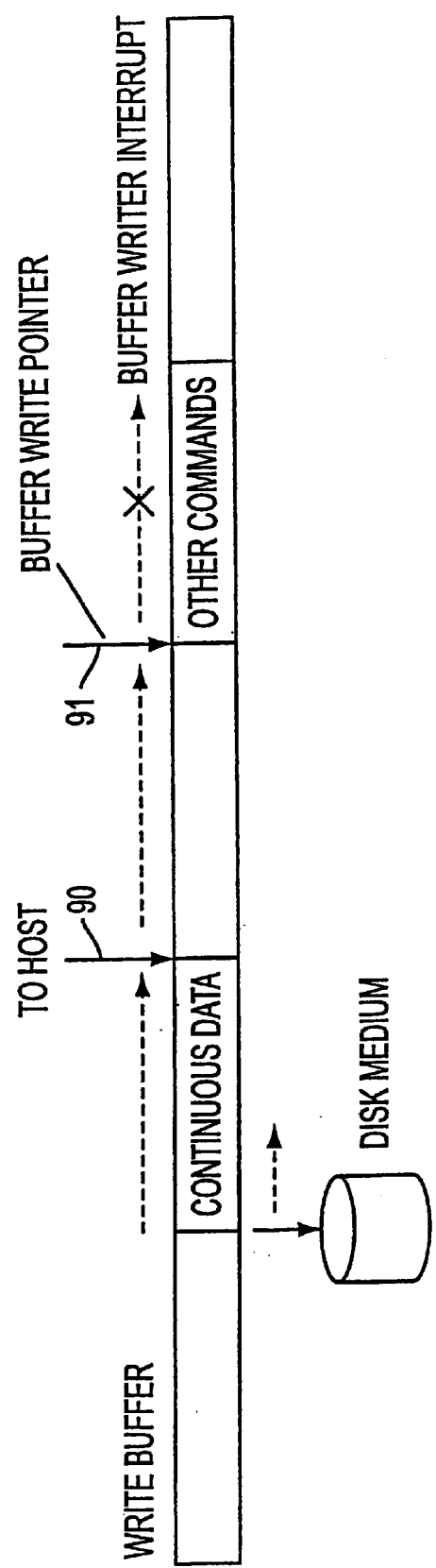
FIG. 13 illustrates a conventional operation of data transfer to a write buffer where reordering is not performed relative to the write commands during the data transfer to the write buffer.
Figure 14:
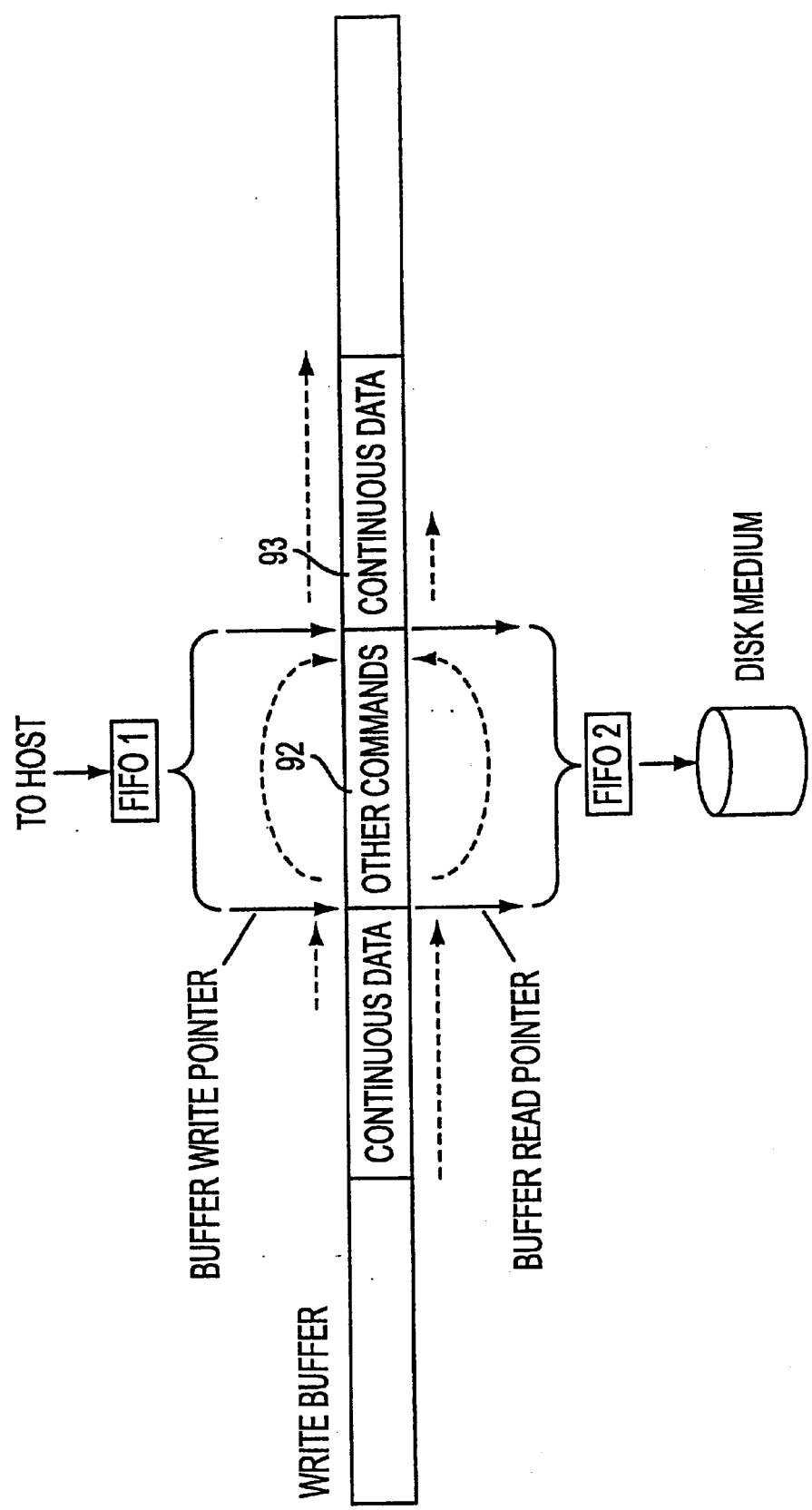
FIG. 14 illustrates an operation wherein commands for which data is being input are added to the ordering with a disk device in accordance with embodiments of the present invention.

FIG. 13 illustrates a conventional example where reordering is not performed relative to write commands during data transfer to a write buffer. FIG. 14 illustrates an operation wherein commands for which data is being input are added to the reordering with a disk device in accordance with embodiments of the present invention.

In order to make it possible to add the commands to the reordering for which data is being input, it must be made possible to simultaneously process write operations to the write buffer and write operations to the disk medium, even when data from other commands exists in the write buffer.

In conventional reordering, reordering is not performed for write commands for which data transfer to the write buffer is in process. The reason for not performing reordering in this situation is that the operation to store to the disk medium the data that is already stored in the write buffer is performed while storing the data from the host to the write buffer when the command in the write buffer starts the disk medium write. However, when this is done, the buffer write is interrupted if there is too much data from other commands in the write buffer, making it impossible to write continuously to the medium.

As shown in the conventional example in FIG. 13, the buffer write pointer for storing the data from the host to the write buffer sequentially moves to the right from the position 90 in FIG. 13, and when the buffer write pointer reaches the point 91 during the performance of the write operations, which is the starting point for the data region for another command, the buffer write cannot continue. Rather, the result is that even the write operations to the disk medium are interrupted.

In accordance with embodiments of the present invention, the write command for which data is being input to the buffer write is also added to reordering. Because reordering performs the function of searching for the next command that can be transferred the most quickly, the larger the number of commands that are subject to reordering, the more effective the reordering. As shown in FIG. 14, if a command for which the buffer write is in process is selected as the next command for execution for the write to the disk medium, the buffer write/disk write is performed using the first-in-first-out memories FIFO1 (17) and FIFO2 (11) that are prepared on the host side and on the medium side of the write buffer 5.

With respect to the buffer write, if the buffer write pointer reaches the data storage area for a different command (92 in FIG. 14) during the period of time it takes the write data to traverse the FIFO1 (17) provided before the write buffer 5, then the start position of the other open region (93 in FIG. 14) is calculated and the buffer write pointer is changed. The same is true for a disk medium write, where, if the buffer read pointer reaches a different command storage region (92 in FIG. 14), then the buffer read pointer is changed to the position where the next data is stored (93 in FIG. 14). Even though no data can be read from the write buffer 5 during the time that the buffer read pointer is moving, the data that has accumulated in the FIFO2 (11) will be transmitted. Thus, it is possible to maintain continuous transfer of data to the disk medium 12.

An operation of establishing a virtual segment in the write buffer, and processing an auto-write without overwriting the other write data in accordance with the present invention will now be described below.

Figure 15:
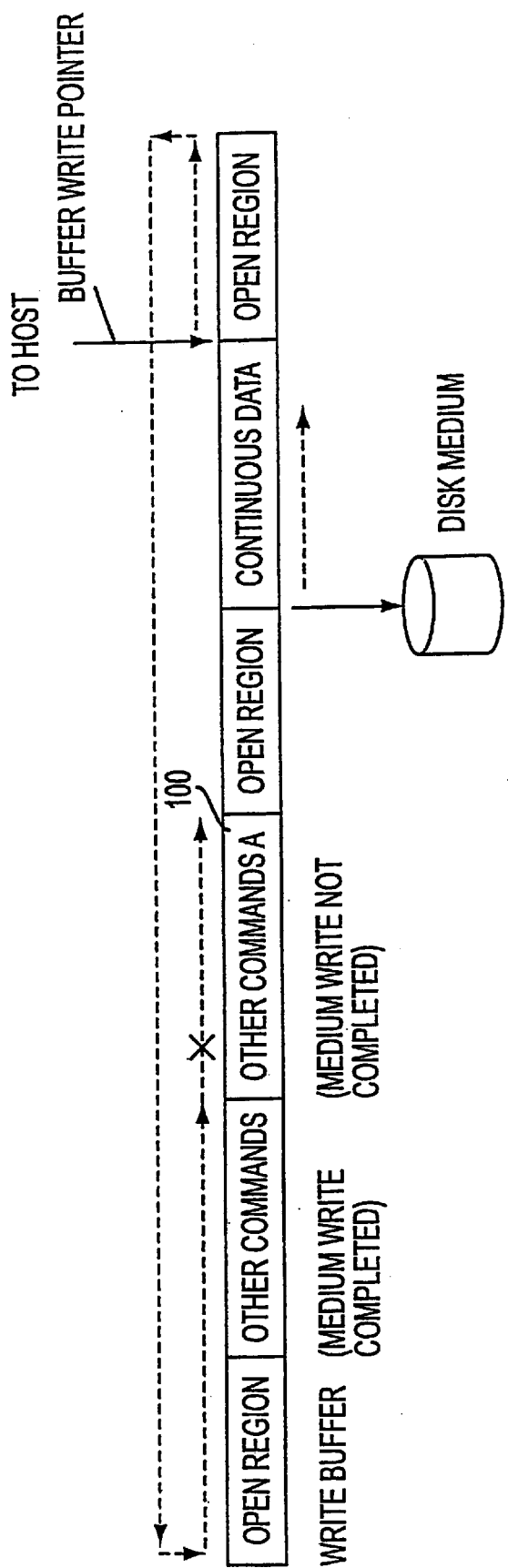
FIG. 15 illustrates a conventional wrap-around processing operation of a buffer wrap pointer.

FIG. 15 illustrates a conventional example of the establishment of virtual segments in the write buffer and the process that performs the auto-write without overwriting write data. FIG. 16 illustrates an operation for establishing virtual segments in a write buffer and performing auto-write without overwriting write data in accordance with the present invention.

FIG. 15 illustrates a conventional example where data is transferred to the write buffer such that, when the write data is stored until the write buffer is filled, the write buffer pointer returns to the beginning of the write buffer, and the next data is stored beginning with the beginning of the write buffer. Consequently, when a write command having a long data length is input, the other write commands that exist in the write buffer (for which the medium write has been completed) are overwritten. If there is a data region 100 corresponding to a write command A that has not been written to the medium, then when the buffer write arrives at the start of region 100 in which the data for command A is stored, the buffer write must be interrupted until the command A data medium write is completed.

As shown in FIG. 16, in accordance with the present invention, the buffer write control determines whether the write command in the buffer write has started the medium write. If the medium write has started, then a search both forwards and backwards is performed within the write buffer from the current buffer storage position within the write buffer. The search extracts the point where data pertaining to other commands is found previous to the current storage position (marked by "α" in FIG. 16) and the point where data pertaining to other commands subsequent to the current storage position is found (marked with "β" in FIG. 16), and the new data buffer storage is limited to between these two points. Even if the data is transferred to the disk medium, the buffer read pointer will be constrained between these two points when the buffer read is performed.

By constraining the buffer read pointer, when the write command in the buffer write begins the medium write operation, a medium write can be performed while the data for the other write commands is still maintained within the buffer. Consequently, even if there is write data A, for which the medium write has not yet been performed, buffer write for the command B within the write buffer will not be interrupted when, during the buffer write, the other command (command B) executes a medium write.

In accordance with embodiments of the present invention, embodiments that use FIFO memory can use two buffer read pointers. For example, in the embodiment wherein there is overlapping data with the first half of the write data of the previous command described above, a buffer read pointer 1 could be the pointer used for buffer read for an existing command 1, while a buffer read pointer 2 could be the pointer used for buffer reading for the overlapping write command 2. When a write command 2 with write data that overlaps with the data of the first half of an existing command 1 is input, then the value of the buffer read pointer 1 would change to the data position after the overlapping data, and the sequential relationship from command 2 to command 1 is memorized. When reading from the write buffer 5 and performing a disk medium write, after the buffer read pointer 2 has moved to the final data position of command 2 and the write buffer 5 has been read, then, by immediately switching to the buffer read pointer 1 and reading the data for command 1, it is possible to store the data continuously to the disk medium.

Furthermore, when processing write commands that are larger than the largest free region, as described above, during the time period when the buffer write pointer 1 is used to store the current command data to the write buffer 5, the next largest open region may be calculated and the starting position thereof is set to the buffer write pointer 2. At the point in time when the buffer write pointer 1 has moved to the end of the largest open region, the pointer that stores in the write buffer 5 is switched from the buffer write pointer 1 to the buffer write pointer 2, and storage to the write buffer 5 is performed continuously.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A disk device, comprising:

a write buffer storing data for a write command received from a host;

a command queue storing commands for which an operation for accessing a disk medium has not been completed;

a reordering processor returning a data write acknowledgment and selecting from the write commands stored in the command queue a next write command to be executed, the next write command to be executed being a command having a starting data storage address on the disk medium that can be reached in the least amount of time from an address on the disk medium at which the last data of a command currently being executed is stored;

a command execution unit executing the command selected by the reordering processor;

a write command overlapping data processor checking for overlapping with the data of the write commands and in the command queue in response to a read command being entered while a write command is being executed; and a read ahead processor interrupting the write command currently being executed and returning said write command to the command queue as a command to write the remaining data and executing the read command in response to the write command overlapping data processor confirming that there is no data overlap.

2. A disk device read/write processing method, comprising:

accumulating in a write buffer data regarding write commands input from a host;

accumulating in a command queue commands for which an access operation for the disk medium has not been completed;

selecting, from the write commands stored in the command queue, a next write command to be performed, the next write command to be performed being a command having a starting data storage address on a disk medium that can be reached in the least amount of time from a data storage address on the disk medium at which the last data of a command currently under execution will be stored;

executing the selected command;

checking for overlapping with the data of the write commands in the command queue when a read command is input while a write command is being executed; and when there is no data overlap, interrupting the write command currently being executed and returning the write command currently being executed to the command queue as a command to write the remaining data and performing the read command first.

3. A disk device processing method, comprising:

storing data for a write command received from a host;

storing commands for which an operation for accessing a disk medium has not been completed;

selecting from the stored write commands a next write command to be executed, the next write command to be executed being a command having a starting data storage address on a disk medium that can be reached in the least amount of time from an address on the disk medium at which the last data of a command currently being executed is stored;

executing the selected write command; and checking for overlapping with the data of the stored write commands in response to a read command being entered while a write command is being executed and, upon confirming that there is not data overlap, interrupting the write command currently being executed and storing same as a command to write the remaining data and executing the read command.

4. A disk device, comprising:

a write buffer storing data for a write command received from a host;

a command queue storing commands instructing one of a read and a write of a disk medium;

a command queue controller reordering commands based on a shortest amount of time between respective disk medium accesses controlled by the commands; and a buffer controller controlling the buffer to eliminate redundant portions of write data stored therein; and a read ahead processor interrupting the write command currently being executed and returning said write command to the command queue as a command to write the remaining data and executing the read command if there is no data overlap.

5. A disk device processing method, comprising:

storing data for a write command received from a host;

storing commands instructing one of a read and a write of a disk medium;

reordering commands based on a shortest amount of time between respective disk medium accesses controlled by the commands;

eliminating redundant portions of the stored write data and checking for overlapping with the data of the stored write commands in response to a read command being entered while a write command is being executed and, if there is no data overlap, interrupting the write command currently being executed and storing same as a command to write the remaining data and executing the read command.

* * * * *

UNITED STATES PATENT AND TRADEMARK OFFICE
CERTIFICATE OF CORRECTION

PATENT NO. : 6,832,288 B2  Page 1 of 1
DATED : December 14, 2004
INVENTOR(S) : Yoshiyuki Ohta et al.

It is certified that error appears in the above-identified patent and that said Letters Patent is hereby corrected as shown below:

Title page,
Item [54], Title, delete in its entirety and replace with the following:
-- READ/WRITE DISK DRIVE HAVING READ AHEAD PROCESSOR WHICH RETURNS A WRITE COMMAND, CURRENTLY BEING EXECUTED, TO COMMAND QUEUE AND EXECUTES READ COMMAND IN RESPONSE TO CONFIRMATION THAT THERE IS NO OVERLAP --

Signed and Sealed this

Fourteenth Day of June, 2005

JON W. DUDAS
*Director of the United States Patent and Trademark Office*